No. 12,035. Reissued Sept. 23, 1902.

C. C. BRADLEY.

THILL COUPLING.

(Application filed June 7, 1902.)

WITNESSES:

F. E. Arthur

V. B. Chase

INVENTOR

Christopher C. Bradley

BY

Smith & Dickson

ATTORNEYS.

UNITED STATES PATENT OFFICE.

CHRISTOPHER C. BRADLEY, OF SYRACUSE, NEW YORK.

THILL-COUPLING.

SPECIFICATION forming part of Reissued Letters Patent No. 12,035, dated September 23, 1902.

Original No. 697,603, dated April 15, 1902. Application for reissue filed June 7, 1902. Serial No. 110,692.

DIVISION B.

*To all whom it may concern:*

Be it known that I, CHRISTOPHER C. BRADLEY, of Syracuse, in the county of Onondaga, in the State of New York, have invented new and useful Improvements in Thill-Couplings, of which the following, taken in connection with the accompanying drawings, is a full, clear, and exact description.

This invention relates to improvements in thill-couplings, having more particular reference to that class in which the jaws are mounted upon a suitable thill or pole iron, one of the jaws being movable into and out of engagement with a draft bolt or knuckle attached to the front axle.

The object of this invention is to provide means for controlling the movement of the movable jaw, which means is adapted for use with thill or pole irons of varying curvatures or forms.

It is well known that in this class of thill-couplings the fixed jaw is usually formed integrally with a short section or stub which forms part of the thill or pole iron and to which section both the movable jaw and the operating-lever are pivoted. This section or stub is usually welded to the main part of the thill-iron, and owing to the fact that these thill-irons are generally curved or bent to conform to the curvature of the thill or pole it is very difficult to properly bend the iron without changing the relative positions of the pivots of the movable jaw and operating-lever, and I therefore provide a suitable spring actuated by the operating-lever and engaged with the movable jaw with a sliding contact, so that the jaw is free to move independently of the spring.

Figure 1:
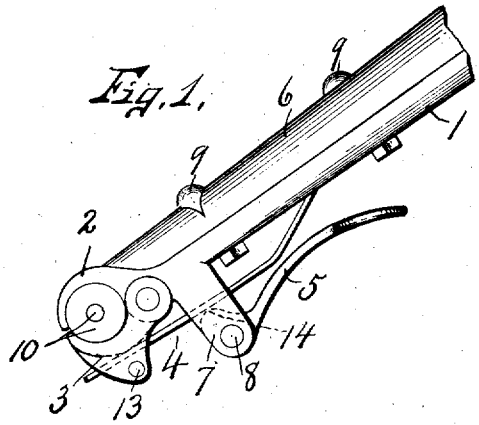
Figure 2:
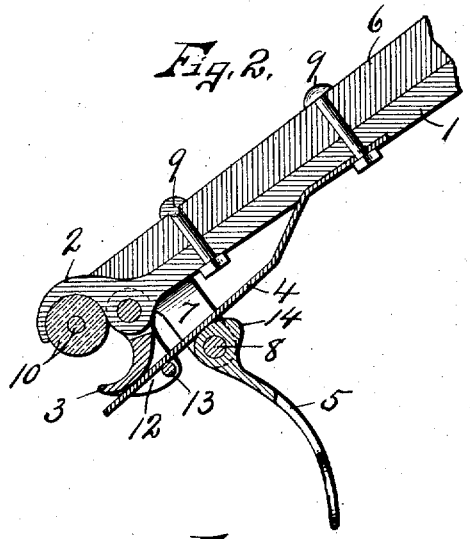
Figure 3:
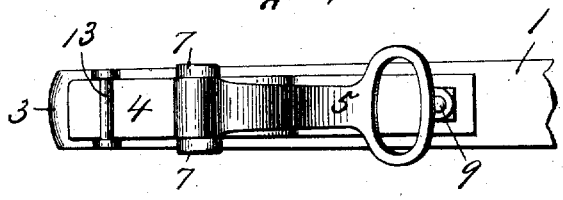

Referring to the drawings, Figure 1 is a side elevation of a thill-coupling embodying my invention. Fig. 2 is a longitudinal vertical section through the parts seen in Fig. 1, the jaws being closed in Fig. 1 and opened in Fig. 2. Fig. 3 is an inverted plan of the parts seen in Fig. 1.

Similar reference characters indicate corresponding parts in all the views.

This invention consists, essentially, of a thill or pole iron 1, a fixed jaw 2, a movable jaw 3, a spring-arm 4, and an operating-lever 5.

The thill or pole iron 1 may be of any desired form adapted to receive a thill or pole 6 and is provided with depending ears or lugs 7 and a pivotal pin 8, which is suitably secured in the lower ends of said ears or lugs 7.

The parts 1 and 2 are secured in the usual manner by bolts or equivalent fastening means 9, one of which serves to secure the one end of the spring-arm 4 to the thill or pole iron 1.

The jaw 2 is preferably fixed and forms an integral part of the thill or pole iron 1 and usually consists of a hook-shaped extremity of the iron 1, having a concave lower face adapted to engage a draft bolt or knuckle 10, which is suitably secured to the front axle of the vehicle in any desired manner, not necessary to herein illustrate or describe.

The lower jaw 3 is pivotally secured at its front end to the thill-iron 1 at a point between the draft-bolt 10 and pivotal pin 8 and is provided with a slot or guideway 12 for receiving the free end of the spring-arm 4, said movable jaw being also provided with a concave engaging face forming a counter part of the jaw 2 to engage the draft bolt or knuckle 10. The slot or guideway 12 is formed in the lower face of the jaw 3 and extends lengthwise of the thill-iron between the lower face of the jaw proper and a suitable transverse pin or shoulder 13, said guideway being open at its front and rear ends for permitting the free movement of the spring-arm 4 therethrough, the upper and lower walls of the slot or guideway 12 forming suitable bearings for the spring 4 to effect the opening and closing the movable jaw as the spring is moved by or against its tension. This spring-arm 4 is secured at its forward end to the lower face of the thill-iron 1 by one of the bolts 9, and its free end extends rearwardly between the ears 7 and also through the slot or guideway 12 between the shoulder 13 and adjacent face of the jaw 3, the free end of the spring being movable toward and away from the fixed jaw 2.

The lever 5 is pivotally mounted upon the pin 8 and is provided with a cam-face 14, movable into and out of engagement with the spring-arm 4, which is normally tensioned outwardly against the adjacent face of the lever 5.

In the operation of my invention when it is desired to close the movable jaw 3 from the position seen in Fig. 2 the lever 5 is rocked forwardly and upwardly upon its pivot 8, whereupon the cam 14 engages the adjacent face of the spring-arm 4 and actuates its free end toward the draft bolt or knuckle 10 against its own tension, and thereby forces the movable jaw 3 into engagement with the lower face of said draft-bolt, the highest point of the cam 14 being rocked rearwardly beyond the pivotal pin 8, and thereby automatically locking the lever 5 in its operative or closed position and also holding the jaw under a yielding pressure in its closed position, it being understood that the cam 14 engages the free end of the spring-arm 4 between its point of securement with the thill-iron and its point of engagement with the movable jaw 3.

The operation of my invention will now be readily understood upon reference to the foregoing description and the accompanying drawings, and it will be noted that one of the essential features of this improvement is the sliding engagement of the movable jaw with the yielding end of a spring-arm.

Having thus described my invention, what I claim, and desire to secure by Letters Patent, is—

1. A thill-coupling comprising a fixed jaw and a movable jaw having a slot, a spring having one end inserted in the slot, the movable jaw having a lengthwise-sliding engagement with the spring, and a lever to act on the spring to close the movable jaw.

2. In a thill-coupling, a fixed jaw and a movable jaw, a spring having one end fixed and its other end free and bearing with a sliding engagement against the movable jaw, and a movable cam acting on the spring to close the jaw.

3. A thill-coupling comprising two jaws, one being movable and provided with separated bearing-faces, a spring having one end fixed and its other end in sliding contact with said bearing-faces and tensioned to separate the jaws, and a lever acting upon and against the tension of the spring to close the jaws.

4. A thill-coupling comprising two jaws, one being movable and provided with separated bearing-faces, a spring having one end fixed and its other end in sliding contact with said bearing-faces and tensioned to separate the jaws and a movable cam engaging the spring between its fixed end and the bearing-faces to close the jaws.

5. A thill-coupling comprising a fixed jaw, a movable jaw having separated bearing-faces, a spring fixed at one end and having its other end inserted between the bearings in sliding contact therewith, and a lever provided with a cam to control the operation of the movable jaw.

Witness my hand this 4th day of June, 1902.

CHRISTOPHER C. BRADLEY.

In presence of—

JESSIE M. HAMMEKEN,
HOWARD P. DENISON.